United States Patent [19]

Hubbard

[11] 4,076,327
[45] Feb. 28, 1978

[54] REMOTE CONTROL CIRCUIT FOR ELECTRIC TRAILER BRAKES

[75] Inventor: Harold C. Hubbard, Lansing, Mich.

[73] Assignee: Motor Wheel Corporation, Lansing, Mich.

[21] Appl. No.: 787,548

[22] Filed: Apr. 14, 1977

Related U.S. Application Data

[62] Division of Ser. No. 615,234, Sep. 22, 1975, Pat. No. 4,033,630.

[51] Int. Cl.² .............................................. B60T 13/74
[52] U.S. Cl. ..................................... 303/20; 188/3 R; 303/7
[58] Field of Search ............... 188/3 R, 138, 161, 267, 188/332; 244/83Z4, 83Z10, 83Z13, 178; 303/3, 7, 15, 20; 318/628; 335/269, 272, 281, 286, 287, 299

[56] References Cited

U.S. PATENT DOCUMENTS

| | | | |
|---|---|---|---|
| 2,475,484 | 7/1949 | DeNise | 318/628 |
| 2,923,499 | 2/1960 | Dinard | 244/83 G X |
| 3,503,652 | 3/1970 | Vanden Broek | 303/3 |
| 3,981,542 | 9/1976 | Abrams et al. | 303/7 X |

*Primary Examiner*—Stephen G. Kunin
*Attorney, Agent, or Firm*—Barnes, Kisselle, Raisch & Choate

[57] ABSTRACT

A remote control circuit for regulating current to electric trailer brakes as a function of the brake fluid pressure within the tractor brake system or in response to activation of a control arm by the tractor operator. A hydraulic transducer is connected directly to the tractor brake system to produce an electrical signal at the control circuit which varies as a function of the hydraulic fluid pressure. An electromagnetic, pressure-responsive circuit is also provided which is operatively connected to the trailer brakes and which retards movement of the operator control arm at the control circuit in proportion to the brake torque applied at the trailer.

5 Claims, 15 Drawing Figures

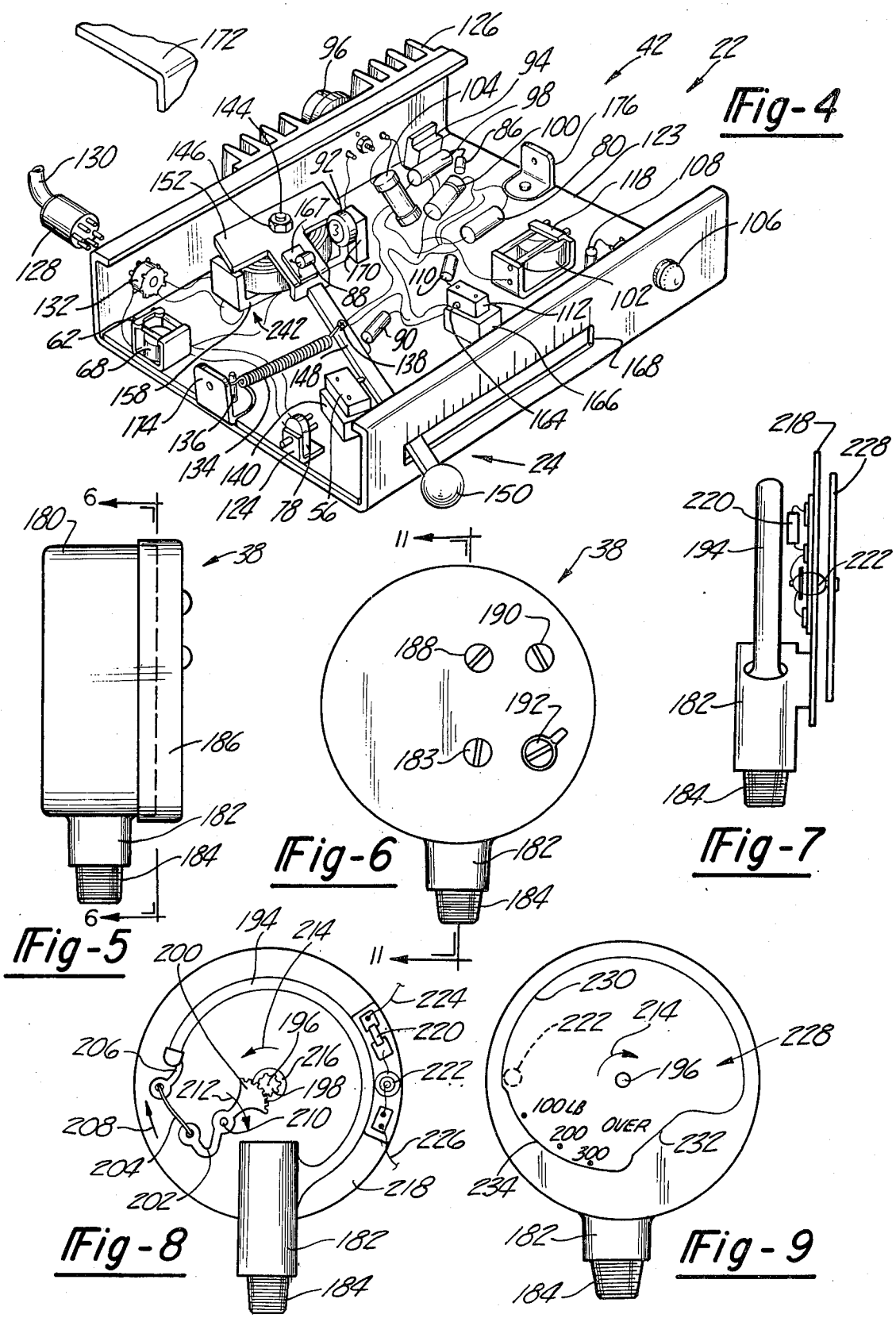

REMOTE CONTROL CIRCUIT FOR ELECTRIC TRAILER BRAKES

This is a division of application Ser. No. 615,234, filed Sept. 22, 1975 now U.S. Pat. No. 4,033,630.

This invention relates generally to electric brakes and, more particularly, to electronic remote control circuits for operating trailer electric brakes from the driver's seat of the tractor.

Objects of the present invention are to provide an electronic trailer brake control circuit which is responsive to activation of the tractor brake system, and is connected thereto in a manner which is more efficient and more reliable than are flexible cable linkages and the like characteristic of the prior art; to provide an electronic trailer brake control circuit in which the above-stated object is accomplished by means of an inexpensive and reliable hydraulic transducer; and to provide an electronic trailer brake control circuit in which the tractor operator may "feel" the brake torque applied at the trailer brakes as a force retarding movement of the control arm at the controller.

The novel features which are considered to be characteristic of the present invention are set forth in particular in the appended claims. The invention itself, however, together with additional objects, features and advantages thereof, will be best understood from the following description when read in conjunction with the accompanying drawings in which:

FIG. 4 is a perspective assembly drawing, partially exploded and broken, which shows the layout of the electronic control circuit provided by the present invention within a protective enclosure;

FIG. 5 is a side view of the hydraulic transducer provided by the present invention within a protective enclosure;

FIG. 6 is a rear view of the enclosed hydraulic transducer shown in FIG. 5;

FIG. 7 is a side view of the working components of the hydraulic transducer and is similar to that view shown in FIG. 5 but with the protective enclosure removed;

FIGS. 8 and 9 are rear and front views respectively of the working components of the hydraulic transducer;

Figure 1:
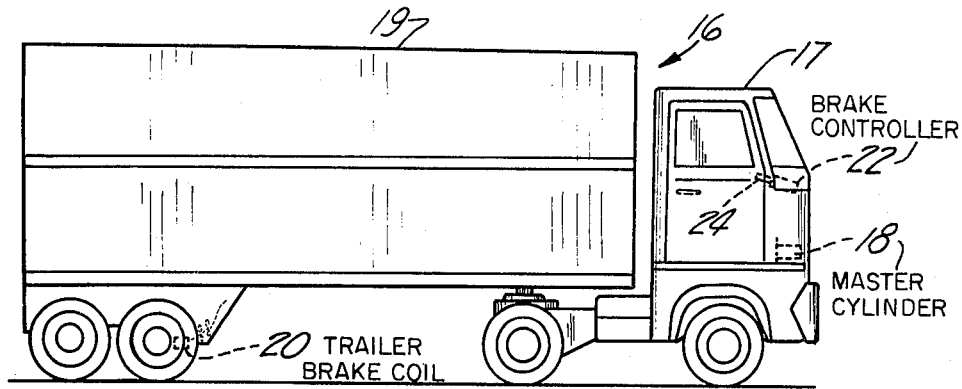
FIG. 1 is a pictorial drawing of a tractor/trailer combination generally depicting portions of the tractor and trailer brake systems with which the present invention is concerned.

Referring to the drawings in which identical reference numerals indicate identical parts, a tractor/trailer combination 16 is generally indicated in FIG. 1 and includes a tractor 17 equipped with a hydraulic brake system including a hydraulic master cylinder 18. A trailer 19 is equipped with electric brakes of the type in which brake torque at a trailer wheel is a function of the electric current through an electromagnetic brake coil 20. Electric brakes of this type are well known in the art and do not, of themselves, form a part of this invention. Brake current to coils 20 is regulated by an electronic brake controller 22 which is normally located at a point remote from coils 20 within the cabin of tractor 17. Controller 22 is of the type which includes an electronic circuit to apply current to coils 20 as a function of the pivotal movement of a control arm 24 which is operated by the driver or operator of tractor 17. The present invention is specifically directed to the electronic control circuit of controller 22.

Figure 2:
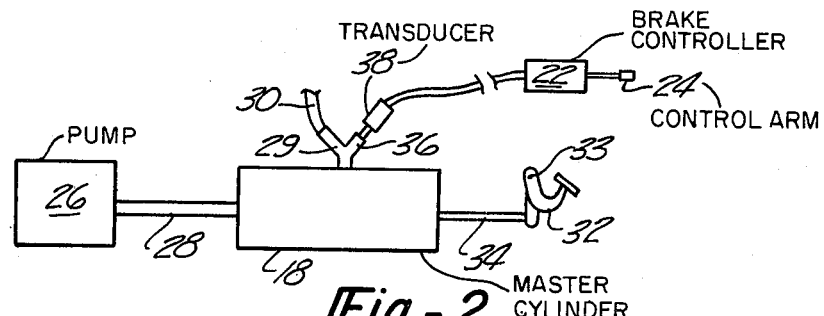
FIG. 2 is a schematic drawing which shows the interconnection between the tractor hydraulic brake system and the electronic trailer brake control circuit provided by the present invention.

Turning to FIG. 2, hydraulic master cylinder 18 is connected to a hydraulic pump 26 by a conduit 28. A Y-fitting 29 connects master cylinder 14 to the various brake cylinders of tractor 17 via port 30. Master cylinder 14 is made responsive to driver control by a foot pedal 32 which pivots about a hinge pin 33, and a control linkage 34 operatively connected to pedal 32. A second fluid port 36 in fitting 29 connects master cylinder 14 to a hydraulic transducer 38 which is connected, in turn, to controller 22 to provide an electrical signal thereto which varies as a function of hydraulic fluid pressure. Thus, controller 22 is to apply brake current to trailer brake coils 20 in response to driver manipulation of control arm 24 or to driver activation of the tractor brakes by means of foot pedal 32.

Figure 3:
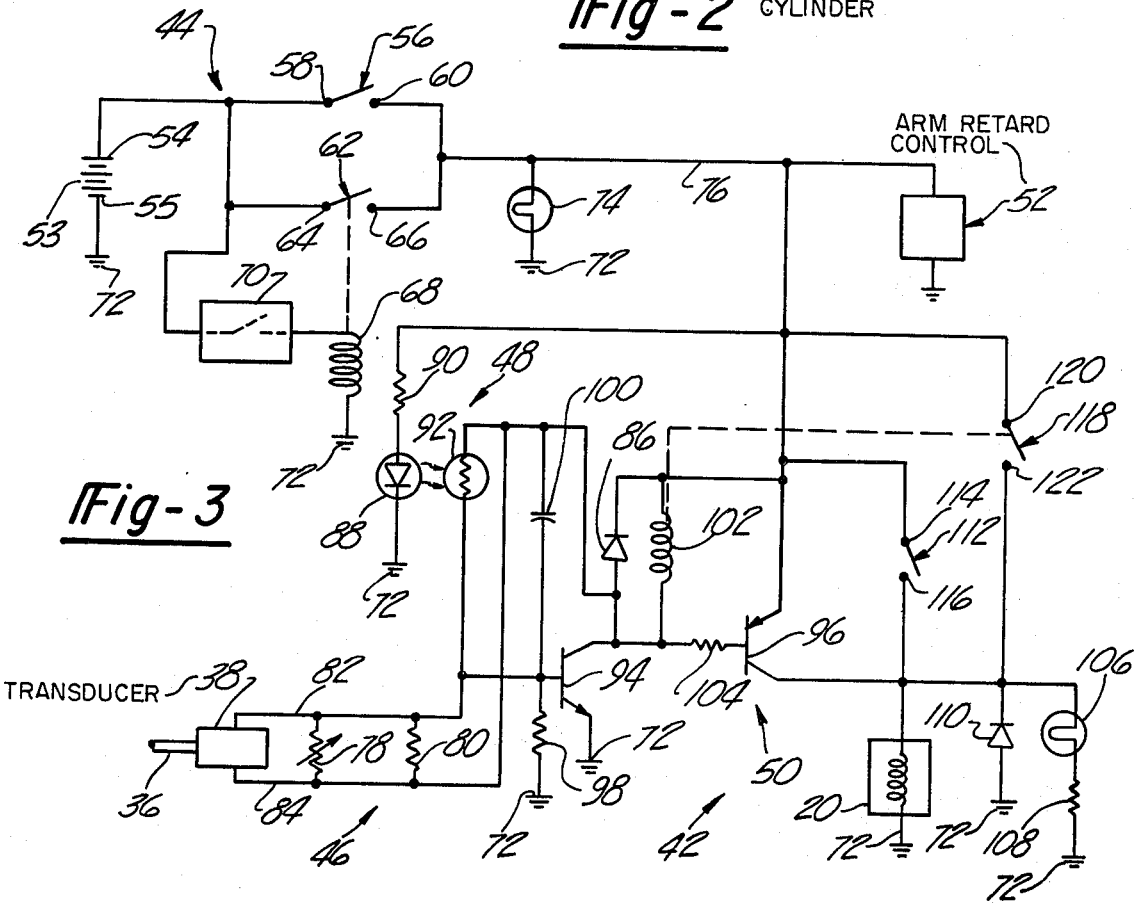
FIG. 3 is a schematic drawing of the electronic brake control circuit provided by the present invention.

FIG. 3 is a schematic drawing of an exemplary but presently preferred embodiment of an electronic control circuit 42 provided by the present invention. Control circuit 42 includes a power control section 44 to control application of battery power to the remainder of the circuit, a hydraulic transducer section 46 to detect activation of the tractor hydraulic brake system, a control arm transducer 48 to detect motion of control arm 24, an amplifier 50 to apply current to brake coils 20 and a control arm motion retarding circuit 52. In power control section 44 a D.C. energy source such as a vehicle battery 53 has a negative terminal 55 connected to a chassis ground 72 and a positive terminal 54. A first limit switch 56 has a pair of normally open contacts 58, 60 connected to battery terminal 54 and an energy bus 76 respectively. A relay switch 62 is magnetically coupled to a relay coil 68 and has a pair of normally open contacts 64, 66 respectively connected to contacts 58, 60. Coil 68 is connected between a tractor stop lamp switch 70 and ground 72. A trailer stop lamp 74 is connected between bus 76 and ground 72. Switch 70 is operatively connected to the tractor brake system to apply power to coil 68 and thereby connect terminal 54 to bus 76 when the tractor brake system is energized. It will be understood that switch 70 is also connected to the tractor stop lamps (not shown) in a conventional manner. Thus, power from battery 53 will be applied to the active components of circuit 42 and will light trailer stop lamp 74 upon closure of switch 56 or upon activation of the tractor brake system causing energization of coil 68 and closure of switch 62.

Hydraulic transducer section 46 of control circuit 42 includes hydraulic transducer 38 which, as described above in connection with FIG. 2, is connected to master cylinder 14 at port 36. A pair of resistors 78,80 are connected in parallel across the conductors 82,84 at the output of transducer 38. Resistor 78 is made adjustable so that the output impedance of transducer section 46 may be matched to the input impedance of amplifier 50. Power is supplied to transducer section 46 by conductor 84 which is connected through a relay coil 102 to bus 76. A diode 86 having its anode connected to conductor 84 and its cathode connected to bus 76 is provided in the reverse voltage direction across coil 102 to suppress inductive ringing therein. Control arm transducer 48 comprises a photo- or light-emitting-diode (LED) 88 having an anode connected to energy bus 76 through a resistor 90 and a cathode connected to ground 72. LED 88 is photonically coupled to a light dependent resistor or photoresistor 92 of the type having a resistance which is inversely proportional to the intensity of the light incident thereon. The light incident upon photoresistor 92 from LED 88 is inversely proportional to the distance therebetween. Photoresistor 92 is connected between conductors 82,84 in parallel with the output from hydraulic transducer 38.

Amplifier 50 comprises an NPN input transistor 94 and a PNP output transistor 96 which, together with associated components, translate signals from photoresistor 92 and transducer 38 into brake current to coils 20. The input to amplifier 50 at the base of transistor 94 is connected to photoresistor 92 and transducer 38 at conductor 82. The base of transistor 94 is also connected to ground 72 through a resistor 98. The emitter of transistor 94 is connected directly to ground 72. To supply power to transistor 94 the collector thereof is connected to coil 102 at the anode of diode 86, and is also connected to the base thereof through a capacitor 100. Coil 102 thus serves a first purpose by providing a power supply path to transistor 94, transducer 38 and photoresistor 92. Output transistor 96 has its base connected to the collector of transistor 94 through a resistor 104 and its emitter connected directly to bus 76. The output of amplifier 50, at the collector of transistor 96, is connected to ground 72 through brake coils 20, and through a series combination of a panel indicator lamp 106 and a current limiting resistor 108. The intensity of radiation from lamp 106 is therefore proportional to the current to coils 20. The collector of transistor 96 is also connected to the cathode of a diode 110 which has its anode connected to ground 72. Diode 110 thus shunts coils 20 in a reverse voltage direction, thereby suppressing inductive ringing therein.

A second limit switch 112 has a pair of normally open contacts 114,116 connected to bus 76 and to the collector of transistor 96 respectively. A relay contact switch 118 operatively coupled to relay coil 102 has a pair of normally open contacts 120,122 connected to bus 76 and the collector of transistor 96 respectively. Thus, closure of switch 112 or switch 118 will short circuit the output of amplifier 50 and connect power bus 76 directly to coils 20. Power bus 76 is also connected to ground 72 through circuit 52, the purpose of which will be explained in detail hereinafter with reference to FIGS. 12 through 15.

An assembled controller 22, including control circuit 42, is shown in perspective in FIG. 4 wherein the components schematically depicted in FIG. 3 have respectively identical reference numerals. Transistor 94, resistors 80, 90, 98, 104 and 108, capacitor 100, diodes 86 and 110, and coils 68 and 102 are mounted to a chassis 123 in a conventional manner and are connected to each other as described in connection with FIG. 3. Adjustable resistor 78 is mounted to chassis 123 by an L-bracket 124. Output transistor 96 is mounted on a heat sink 126 which is, in turn, carried by chassis 123. A harness 130 connects circuit 42 to brake coils 20, stop lamp switch 70, battery 53, trailer stop lamp 74 and transducer 38 by means of a pair of mating connectors 128,132 respectively carried by harness 130 and chassis 123. Control arm 24 includes an arm 148 which extends through an elongated slot 168 in the front face of chassis 123 to terminate in a spherical handle or knob 150. The end of arm 148 remote from knob 150 terminates in a magnetically permeable armature 152 and is carried by a standard 144 mounted to chassis 123. Standard 144 terminates above armature 152 in a threaded shank which receives a nut 146 to clamp control arm 24 such that the arm may pivot about the axis of standard 144. Disposed between armature 152 and chassis 123, and fixedly attached to the chassis, is an electromagnet 242 the structure of which is shown in detail in FIG. 15 and will be discussed in connection therewith.

Control arm 24 pivots about standard 144 between first and second limit positions defined by abutment of the arm 148 with first and second limit switches 56,112 respectively. Limit switches 56,112 are fixedly mounted on the blocks 140,166 such that the respective switch actuators 142,164 are activated by arm 148 in the first and second limit positions thereof. Control arm 24 is biased to the first limit position by a spring 134 fixedly attached to chassis 123 by a stud 136, and attached to control arm 24 by a screw 138. During trailer brake operation arm 24 may be pivoted to the second limit position by the tractor operator. LED 88 is mounted on armature 152 by a terminal board 167, and is directed to transmit light transversely of arm 24. Photoresistor 92 is fixedly mounted to chassis 123 by a standoff 170 in substantial alignment with LED 88 and is directed transversely of control arm 24 in a direction opposite to that of LED 88 so that the intensity of the light incident upon photoresistor 92 is inversely proportional to pivotal displacement of control arm 24 between the first and second limit positions. Control circuit 42 is protectively enclosed by a cover 172 (only partially depicted in FIG. 4) which is affixed to chassis 123 by a pair of L-brackets 174,176.

In operation, control circuit 42 may be actuated by the tractor operator either by pivotal displacement of control arm 24 or by activation of the tractor hydraulic brake system. Taking the former case first, a small displacement of control arm 24 away from the first limit position will allow closure of normally open contacts 58,60 and apply energy from battery 53 to control circuit 42. Current from power bus 76 will flow through coil 102 to the collector of input transistor 94. This current will continue through capacitor 100 into the base-emitter junction of transistor 94 so that transistor 94 will conduct, causing conduction through resistor 104 and the emitter-base junction of transistor 96. Transistor 96 will thus conduct providing an initial surge of current to coils 20 to magnetize the coils and bring them into proximity with the armature plates of the electric brakes. When capacitor 100 is sufficiently charged by the above-mentioned current therethrough, the initial surge current into the base-emitter junction of transistor 94 will terminate, thereby terminating the current surge to coils 20. The current into the base of transistor 94 will now depend upon the relative resistance of photoresistor 92 as compared to resistor 98.

As control arm 24 is displaced further from its first limit position, LED 88 is brought into closer proximity with photoresistor 92. The increasing intensity of the light incident on the photoresistor causes a decrease in the resistance thereof so that increased current will be fed to the base of transistor 94 from bus 76. This increased current into the input of amplifier 50 results in increased conduction of output transistor 96 and increased current to coils 20. Current to coils 20 is therefore proportional to the pivotal displacement of control arm 24 between its first and second limit positions. When control arm 24 reaches its second limit position, the arm will contact actuator 164 of switch 112 and close normally open contacts 114,116, thereby applying energy from bus 76 to brake coils 20 directly. In this manner switch 112 not only takes the load off of the active components of amplifier 50 during periods of high brake current, but also provides a fail-safe brake current path so that coils 20 may be activated by the tractor operator even if either or both of transistors 94,96 should fail.

Activation of control circuit 42 through the tractor brake system is similar to that set forth immediately above. Activation of the tractor brake system closes stop lamp switch 70 thereby energizing relay coil 68 and closing normally open contacts 64, 66. Application of energy from battery 53 to bus 76 provides an initial current surge to coils 20 in the manner set forth above. As fluid pressure in the tractor brake system increases, the resistance of transducer 38 decreases allowing more current into the base of transistor 94. This increased input current will result in an increased output current to coils 20 substantially in the manner set forth above.

Adjustable resistor 78 is to be calibrated such that the output impedance of circuit 46 is substantially identical to the input impedance of amplifier 50. Coil 102 is to be chosen such that the current therethrough at the minimum resistance of hydraulic transducer 38, that is, the current through relay coil 102 at maximum hydraulic fluid pressure, will activate relay switch 118 and provide closure between normally open contacts 120,122. Switch 118 will thus short circuit the output of amplifier 50 at maximum hydraulic fluid pressure and connect coils 20 directly to bus 76. In this way, coil 102 not only supplies power to the input stage of amplifier 50 but also provides a fail-safe which insures that brake current will be supplied to coils 20 when the tractor brake system is activated even if either or both of transistors 94,96 fail.

The fully assembled hydraulic transducer 38 is shown in FIGS. 5 and 6 and comprises a converted pressure gauge having a rear cover 180 mounted to a hollow support 182 by a screw 183. Transducer 38 is to be threadably received onto port 36 of master cylinder 14 (FIG. 2) and is therefore provided with a hollow threaded shank 184 extending from support 182. A front cover 186 is mounted to rear cover 180 in a manner suitable for easy removal thereof. Also mounted to rear cover 180 is a calibration screw 188 and a pair of screws 190 and 192 by means of which electric power is supplied to the transducer.

The internal components which comprise transducer 38 may best be seen in FIGS. 7 through 11. A Bourdon tube 194 is connected to support 182 and communicates with port 36 through shank 184 to provide pivotal motion about an axis 196 in proportion to the input fluid pressure in a manner identical to that of a conventional pressure guage. More specifically, increasing pressure in tube 194 causes movement of the linkages 202,204 and 206 in the direction 208 so that a gear 200 pivots about a fixed axis 210 in a direction 212. Pivotal motion of gear 200 in direction 212 results in pivotal motion of a gear 198 about axis 196 in the direction 214. A decrease in the hydraulic fluid pressure in tube 194 will result in relaxation of the tube and movement of linkages 202,204 and 206 in a direction opposite to direction 208. Gear 198 will pivot about axis 196 in a direction opposite to direction 214 as impelled by gear 200 and assisted by a spirally wound return spring 216.

A circular face plate 218 having a resistor 220 and a light emitting diode (LED) 222 carried near the periphery thereof is mounted to support 182 coaxially with axis 196. LED 222 is disposed at a fixed radial distance from axis 196 and emits light parallel thereto. Resistor 200 and LED 222 are connected in series between screws 190,192 by the conductors 224,226. Screws 190 and 192 are to be respectively connected to bus 76 and ground 72 (FIG. 3). Thus, LED 222 will emit light when power is applied to bus 76, i.e., when the trailer brakes are to be applied.

Figure 10:
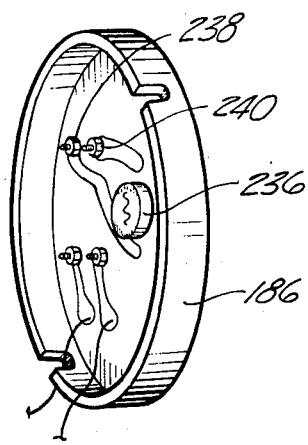
FIG. 10 is a perspective view of the transducer front cover which shows the arrangement of components thereon.
Figure 11:
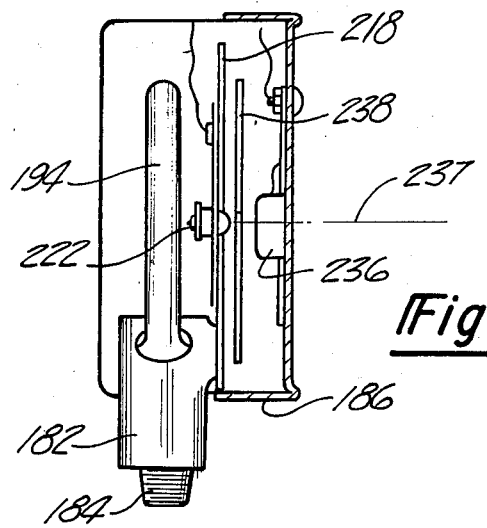
FIG. 11 is a transverse sectional view of the enclosed hydraulic transducer taken along the line 11—11 of FIG. 6.

An opaque shutter 228 is mounted to gear 198 for pivotal motion about axis 196 in a plane perpendicular thereto. As best seen in FIG. 9, the periphery of shutter 228 has a first portion 230 at a radial distance from axis 196 which is greater than the radial distance between LED 222 and axis 196, and a second portion 232 having a radius which is less than the radial distance to LED 222. The periphery of shutter 228 also contains a third portion 234, disposed between portions 230,232 and having a radial distance from axis 196 which decreases as a function of, and preferably in linear proportion to, the angular distance between portions 230 and 232. Pivotal motion of shutter 228 about axis 196 in direction 214 will then gradually expose LED 22 as viewed remotely therefrom along axis 196, i.e., as viewed in FIG. 9. Since this pivotal motion and gradual exposure is a function of the pressure in tube 194, portion 234 of the periphery of shutter 228 may be calibrated in pounds of fluid pressure as shown in FIG. 9. To sense the above-mentioned pivotal movement of shutter 228 and exposure of LED 222, a photoresistor 236 is mounted in cover 186 at the same radial distance from axis 196 as is LED 222, and is to be aligned with LED 222 along an axis 237 parallel to but displaced from axis 196 when cover 186 is attached. This relationship between LED 222 and photoresistor 236 is best seen in FIGS. 10 and 11. Cover 186 is provided with a pair of screw terminals 238,240 for connection of conductors 82 and 84 across photoresistor 236. Thus, the resistance of photoresistor 236, and therefore the output resistance of transducer 38, is inversely proportional to the hydraulic fluid pressure at port 36.

Figure 12:
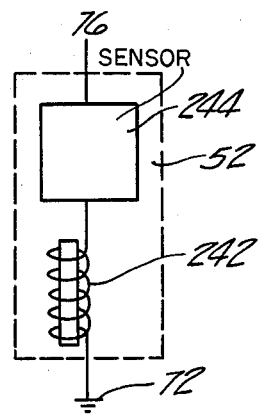
FIG. 12 is a schematic diagram of an electromagnetic circuit provided by the present invention to retard pivotal movement of the operator control arm as a function of trailer brake torque.
Figure 13:
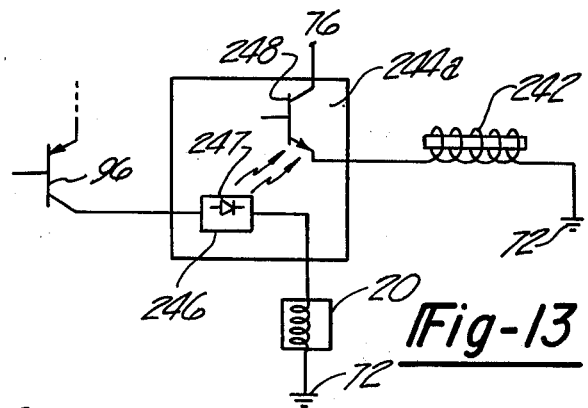
FIG. 13 is a schematic drawing which shows in detail one embodiment of the sensing circuit of FIG. 12.

FIG. 12 is a schematic diagram depicting the details of electromagnetic circuit 52 which is shown in block form in the schematic diagram of FIG. 3. As shown in FIG. 12, circuit 52 comprises electromagnet 242 and a sensor 244 connected in series between bus 76 and ground 72. Sensor 244 is to be operatively connected to the ouput of amplifier 50 and is to have a current conduction characteristic which permits the current to electromagnet 242 to increase as a function of the output of amplifier 50. FIG. 13 is a schematic diagram which depicts one embodiment 244a of sensor 244. A source 246 which includes an LED 247 and appropriate current sensing and amplification circuitry (not shown) is connected between the collector of transistor 96 and brake coils 20. A phototransistor 248 has its collector connected to bus 76 and its emitter connected to ground 72 through electromagnet 242. The base of phototransistor 248 is photonically coupled to LED 247. The current conducted through phototransistor 248 is proportional to the current through LED 247 which, in turn, is preferably proportional to the brake current through coils 20.

Figure 14:
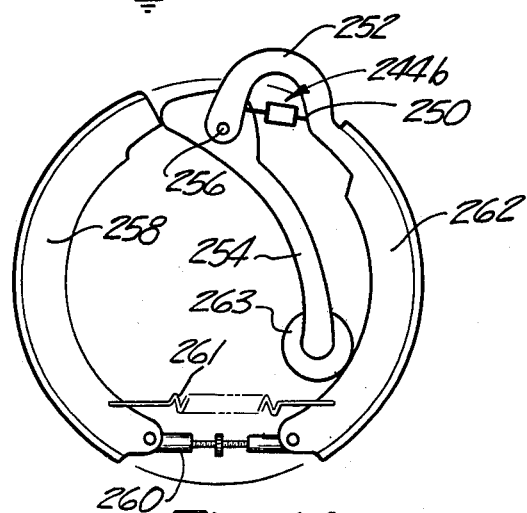
FIG. 14 is a schematic view of an electronic brake unit which includes an alternative embodiment of the sensing circuit of FIG. 12.

FIG. 14 shows another embodiment 244b of sensor 244 comprising a pressure sensitive resistor 250 connected across a shock absorbing U-link 252 in an electric brake. In this type of brake, a primary shoe 258 and a secondary shoe 262 are connected by a cross-link 260 and are biased to a normally disengaged position by a spring 261. Link 252 connects shoe 262 to the usual anchor pin 256 and preferably comprises a steel bar or beam bent into the shape of a horseshoe. Thus link 252 forms a spring between shoe 262 and pin 256, which spring is deflected or compressed by the forces exerted on the shoe with respect to the pin. An electromagnet or brake puck 263, which includes coil 20, is disposed at the end of an actuator arm 254. When current is applied to coil 20, arm 254 pivots about pin 256 camming primary shoe 258 into the brake drum. The opposing force supplied by the drum to shoe 258 causes at least part of the total braking force to be transferred through link 260 to secondary shoe 262. Movement of show 262 into the brake drum results in flexure of link 252. Pressure sensitive resistor 250, which may be of the piezo-electric type, traverses U-link 252 and is attached thereto so that flexure of the link causes a change in the pressure applied to the pressure sensitive element of the resistor. In this way the resistance of resistor 250 is inversely proportional to the work done by shoes 258 and 260, and, therefore, is inversely proportional to the output of amplifier 50. The current through resistor 250 into electromagnet 242 will be directly proportional to work done by the brake shoes within the operational limits of resistor 250.

Figure 15:
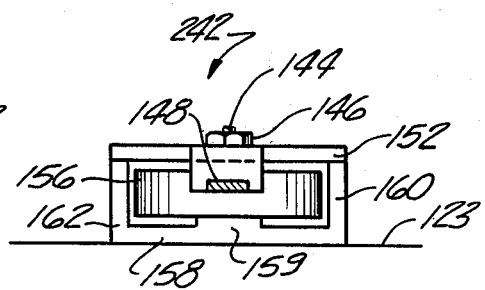
FIG. 15 is an elevated sectional view which laterally bisects the control arm in the direction of the pivotal axis thereof as seen in FIG. 4, and which shows the structural details of the arm-retarding electromagnet 242 schematically depicted in FIGS. 12 and 13.

The structure and function of electromagnet 242 will be best understood with reference to FIG. 15. A pole piece 158 having a central core 159 and a pair of radially spaced poles 160,162 is mounted to chassis 123 such that poles 160,162 terminate in proximity to armature 152 of control arm 24. Wound about central core 159 is a coil 156 which is electrically connected as shown in FIG. 12 between sensor 244 and ground 72. In operation, the current through coil 156 is a function of the output of amplifier 50 as explained above. Therefore, the magnetization of pole piece 158 and the magnetic attraction between poles 160,162 and armature 152 will also be a function of the output of amplifier 50. This magnetic attraction manifests itself to the tractor operator as a force which retards further movement of control arm 24. Thus, the driver will "feel" the brake torque being applied at the trailer wheels as a force retarding movement of the control arm. The material from which pole piece 158 is fabricated is to be chosen such that the pole piece will not become magnetically saturated within the normal range of current through coil 156.

The invention claimed is:

1. In an electronic brake control circuit for trailers equipped with electric brakes of the type in which brake torque is a function of electric current through an electromagnetic brake coil, said control circuit including means to provide an output to said coil as a function of displacement of an operator-responsive control arm, the combination comprising means to provide an electrical signal which varies as a function of said controller output, and electromagnetic means magnetically coupled to said control arm to retard displacement thereof as a function of said electrical signal.

2. The combination set forth in claim 1 wherein said electrical signal providing means comprises means connected in series between said control circuit and said brake coil to provide said electrical signal as a function of said coil current.

3. The combination set forth in claim 1 wherein said electric brakes are of the type having a brake drum and at least one brake shoe, and wherein said electrical signal providing means comprises means connected to said at least one brake to provide said electrical signal as a function of brake forces applied to said drum by said shoe.

4. The combination set forth in claim 3 wherein said electric brakes are of the type having a brake drum and a brake shoe operatively connected to a fixed point relative to said drum by a shock absorbing U-shaped link, and wherein said electrical signal providing means comprises pressure responsive means connected across said link.

5. The combination set forth in claim 1 wherein said electromagnetic means comprises a magnetically permeable armature fixedly connected to said control arm, and an electromagnet having at least one pole piece disposed in proximity to said armature and an electrical coil to magnetically energize said at least one pole piece as a function of said electrical signal.

* * * * *

UNITED STATES PATENT AND TRADEMARK OFFICE
CERTIFICATE OF CORRECTION

PATENT NO. : 4,076,327
DATED : Feb. 28, 1978
INVENTOR(S) : Harold C. Hubbard

It is certified that error appears in the above-identified patent and that said Letters Patent are hereby corrected as shown below:

Claim 3, line 37, after "brake" insert -- shoe --

*Signed and Sealed this*

*Twentieth Day of June 1978*

[SEAL]

Attest:

RUTH C. MASON
*Attesting Officer*

DONALD W. BANNER
*Commissioner of Patents and Trademarks*